United States Patent [19]
Dubach et al.

[11] Patent Number: 4,793,499
[45] Date of Patent: Dec. 27, 1988

[54] TAMPER EVIDENT CLOSURE DEVICE

[75] Inventors: Werner F. Dubach, Maur, Switzerland; Kenneth M. Sinnott, St. Noets, United Kingdom

[73] Assignee: Alfatechnic AG, Switzerland

[21] Appl. No.: 120,633

[22] Filed: Nov. 13, 1987

[30] Foreign Application Priority Data

Nov. 14, 1986 [GB] United Kingdom ................ 8627251

[51] Int. Cl.⁴ .............................................. B65D 41/04
[52] U.S. Cl. .................................... 215/230; 215/258; 29/451; 249/67
[58] Field of Search ............... 215/230, 258, 329, 252; 264/334; 249/67, 63; 29/451, 453

[56] References Cited

U.S. PATENT DOCUMENTS

| | | | |
|---|---|---|---|
| 4,157,144 | 6/1979 | Weiler et al. | 215/252 |
| 4,493,427 | 1/1985 | Wolkonsky | 215/258 X |
| 4,530,437 | 7/1985 | Gray et al. | 29/451 X |
| 4,552,328 | 11/1985 | Dutt et al. | 249/67 |
| 4,643,321 | 2/1987 | Gach | 215/252 |

FOREIGN PATENT DOCUMENTS 1139403 11/1962 Fed. Rep. of Germany.
2518117 4/1976 Fed. Rep. of Germany.

OTHER PUBLICATIONS

Pye, R., "Assembling Parts in the Mold", Modern Plastics, vol. 47, No. 7, pp. 90-94, McGraw-Hill, New York, Jul., 1970.

Primary Examiner—Donald F. Norton
Attorney, Agent, or Firm—Thomas W. Speckman

[57] ABSTRACT

A tamper evident closure device having a closure with an internally threaded skirt with a groove therein between radially outer and inner skirt portions to receive a tamper evident band having an inwardly extending bead which engages under a transfer ring of a container to hold the tamper evident band down and hence separate it from the closure as the closure is unscrewed from the container. A method of simultaneously stripping the closure and tamper evident band from a common mold core is also disclosed.

12 Claims, 3 Drawing Sheets

TAMPER EVIDENT CLOSURE DEVICE

BACKGROUND OF THE INVENTION

1. Field of the Invention

The present invention relates to a plastic tamper evident closure which indicates to a potential purchaser if the closure has previously been removed and replaced, after initial filling of the container to which the closure has been applied.

2. Description of the Prior Art

Known tamper evident plastic closures frequently have a tamper evident band which is joined to the main part of the closure by frangible bridges which become ruptured as the closure is unscrewed. As a result, if the closure is re-applied, the fact that the tamper evident band has already been separated from the skirt of the closure is a clear indication that the closure has at least once been removed from the container after packing. The arrangement is normally such that it is intended that the closure can be applied to the container without damage to the frangible bridges which are then ruptured upon first removal of the closure.

However, tamper evident features comprising frangible bridges have two principal shortcomings. Firstly, the bridges may not all be broken as the closure is unscrewed from the container which then makes it difficult to remove the closure from the container. Secondly, some of the bridges may break when the closure is being applied to the container.

SUMMARY OF THE INVENTION

It is an object of the present invention to avoid these shortcomings of incomplete rupture of frangible portions joining a tamper evident band to the closure on removal of the closure and premature rupture on applying the closure to the container.

This object is achieved by providing a tamper evident band which is not joined to the closure by frangible bridges. In the present invention here are no integral connections between the band and the closure. The band is merely mechanically locked to the closure in such a way that it can be released from the closure only by an axial force. Thus any radial forces arising during application of the closure to the container cannot result in premature damage to the tamper evident feature. When the closure is unscrewed from the container the resulting axial forces easily disengage the tamper evident band from the closure.

Thus, according to one embodiment of the present invention there is provided a plastic tamper evident closure device comprising a container closure and an annular tamper evident member which is mechanically engaged with the closure but not integrally connected to it whereby removal of the closure from the container results in disengagement of the tamper evident band from the closure as a result of axial force developed during removal of the closure.

A second embodiment of the invention provides a plastic tamper evident closure device comprising a container closure having a skirt, and a tamper evident band including projecting means able to hold the tamper evident band on a container while the closure is removed therefrom, said closure skirt being formed with an annular groove between radially spaced skirt portions of the closure, and the tamper evident band being dimensioned to be received within said annular groove with difficulty.

Preferably the tamper evident band is in the form of several segments which need to be held in precisely concentric array in order to reconnect the closure to the tamper evident band, with the result that it is not easy to replace the band except with special tooling.

A further feature of the present invention provides a method of forming a plastic tamper evident closure device, comprising molding a closure and a separate tamper evident band therefor, the closure having been formed with an annular groove between radially inner and outer skirt portions of an internally threaded skirt of the closure; and inserting one end of the tamper evident band in said annular groove of the closure.

In a particularly preferred embodiment of the present invention the arrangement is such that the closure and the tamper evident band are molded simultaneously and become engaged together during the action of bumping or stripping the closure and the tamper evident band from the mold.

The tamper evident band or other tamper evident member is, in accordance with the present invention, not integrally connected to the closure once the closure has been applied to the container and there is simply a readily releasable connection between the tamper evident band or member and the closure to indicate to the potential purchaser whether or not the closure has been removed subsequent to filling of the container.

Another feature of the invention provides apparatus for molding a plastic tamper evident closure comprising a common mold core for defining the interior of an internally threaded closure and a tamper evident band therefor; means defining an annular groove between radially inner and radially outer portions of the skirt of said closure; means defining a tapered surface to a tamper evident band defined by the molding apparatus; and means for driving said tamper evident band into said annular groove after withdrawal of the groove defining component of said molding apparatus, and for thereby ejecting said tamper evident band and said closure from the common mold core.

BRIEF DESCRIPTION OF THE DRAWINGS

In order that the present invention may be more readily understood the following description is given, merely by way of example, with reference to the accompanying drawings in which.

DESCRIPTION OF PREFERRED EMBODIMENTS

The side elevational views of FIGS. 1 to 4 illustrate the principles of the present invention in terms of the operation of the closure device.

Figure 1:
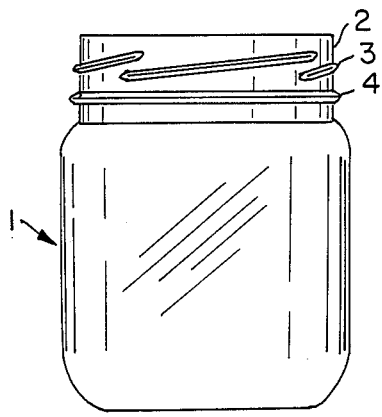
FIG. 1 is a side elevational view of a container prior to application of a closure device thereto.

Container 1 of FIG. 1 has neck 2 with multi-start threads 3, and transfer ring 4 projecting outwardly from the container neck and serving to facilitate handling of the container at the end of its molding operation while the container is still in a hot state.

Figure 2:
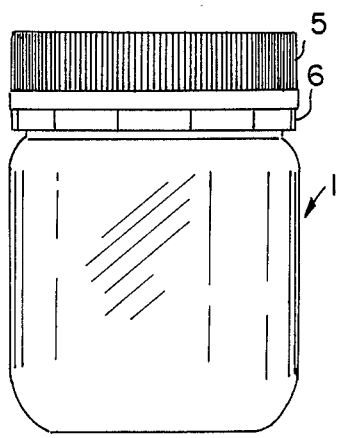
FIG. 2 is a view of the container of FIG. 1 having a tamper evident closure device thereon.

FIG. 2 shows the same container 1 having its neck closed by a tamper evident closure device comprising a plastic closure 5 having a plastic tamper evident band 6 which is partially inserted into the closure skirt.

Any suitable plastic material may be used for molding the closure 5 and for the tamper evident band 6, such as polypropylene, ethylene-propylene copolymer, polyethylene, polystyrene, polyethylene terephthalate, and may be with or without fillers, and may include any suitable pigments, dyes, anti-static agents, anti-oxidants, and lubricants.

Figure 3:
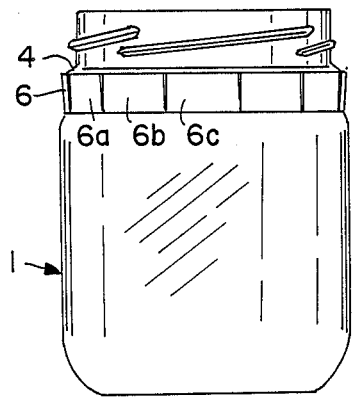
FIG. 3 is a view corresponding to FIG. 1 showing a container with a tamper evident band of a closure device still attached thereto.

By way of example, FIG. 3 shows the tamper evident band 6 after separation from the closure 5, and this figure shows the plurality of segments 6a, 6b, 6c, etc. of the tamper evident band joined at their lower portions but splayed apart at their upper portions by the container neck transfer ring to provide a generally frustoconical form to the tamper evident band.

It will of course be appreciated that in the FIG. 2 situation, where tamper evident band 6 is inserted in the skirt of the closure 5, the various segments 6a, 6b, 6c, etc. form a substantially cylindrical outer surface in that the V-shaped slots between successive segments 6a and 6b, 6b and 6c, etc. are of uniform width whereas in FIG. 3 they are shown as increasing in width toward the open end of the container neck.

Figure 4:
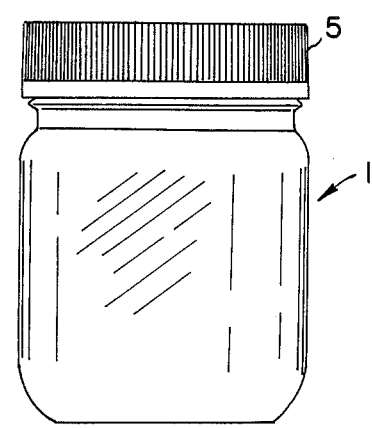
FIG. 4 shows, by way of comparison, a container having had a tamper evident closure device removed and a closure thereof re-applied without a tamper evident band re-applied thereto.

FIG. 4 shows the container 1 after re-application of closure 5 without the tamper evident feature.

Figures 5A, 5B:
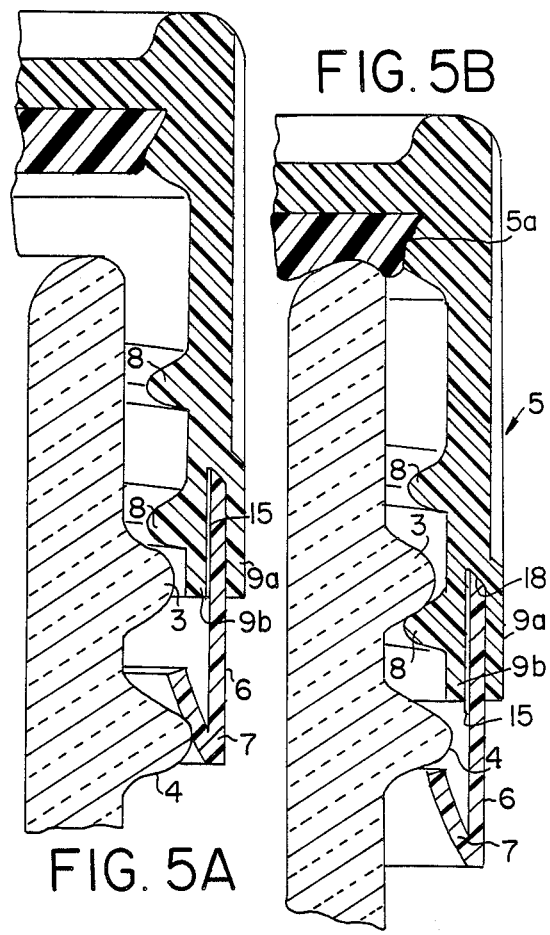
FIG. 5A is a sectional view of a container neck showing a closure and tamper evident band being applied thereto.
FIG. 5B is a view similar to FIG. 5A showing the tamper evident closure device at the end of the operation of its application.

As shown in FIGS. 5A and 5B, tamper evident band 6 has an upwardly extending bead 7 in the form of a flexible skirt which, as the tamper evident closure device is moved downwardly during closing of the container, engages under transfer ring 4.

As shown in FIGS. 5A and 5B, the closure has a sealing gasket 5a of a plastic material which is softer than the material used for the closure proper.

In the conventional way, the closure skirt is provided with internal threads 8 to cooperate with the external threads 3 of the container neck.

In the figures of the preferred embodiments a four start thread is used. However, other arrangements such as a two start thread or a one start thread are possible.

When the closure is unscrewed from container 1, engagement of the bead 7 of tamper evident band 6 below transfer ring 4 holds tamper evident band 6 down until eventually closure 5 has been fully separated from the tamper evident band 6 and tampering is indicated.

In the fully separated configuration of the tamper evident band, the upper ends of the segments splay apart from one another and the tamper evident band 6 is able to drop down onto the barrel-shaped outer surface of the container 1, with the result that it is very difficult, if not impossible, to be able to hold all of the segments 6a, 6b, 6c, etc. in precisely the required cylindrical configuration, at least without the provision of suitable tools, in order to reconnect tamper evident band 6 and closure 5. Effectively, therefore, it is not easy to reassemble closure 5 and tamper evident band 6 in the store and hence a workable tamper evident feature has been effected.

It is not essential for the tamper evident band to be of segmented construction. As a workable alternative, tamper evident band 6 could be continuous around its circumference but dimensioned to make it difficult to re-engage the upwardly projecting end of the tamper evident band with the closure skirt, in this case by inserting it in the deep annular groove 15 formed between outer and inner skirt ports 9a and 9b, respectively, of the closure 5.

If desired, the tamper evident band and the closure ma be joined by breakable bridges in the "as molded" state and these bridges may be separately broken when the tamper evident band is inserted in groove 15 between the two skirt portions 9a and 9b. However, such integral molding is not essential as the tamper evident band and the closure may be made entirely separately, but with the segments of the tamper evident band joined together in order to facilitate assembly of the closure and the tamper evident band.

If not integrally molded, tamper evident band 6 and closure 5 may, if desired, be made of different materials, in order to take advantage of different properties of the material of the tamper evident band on the one hand and of the closure on the other hand. Also, it is possible for the closure and the tamper evident band to have different colors in order to discriminate more clearly between the closure, on the one hand, and the tamper evident band, on the other hand.

Although, as shown in FIGS. 5A and 5B, the closure is provided with a relatively softer sealing gasket, other sealing means may be provided, for example an inserted disc seal may be incorporated, or the entire closure may be made of the same material and rely on the provision of sealing means such as flexible flanges to seal against the container neck. Alternatively, there may be no seal of any kind.

FIG. 5A shows the position when the closure device, the closure and tamper evident band combination, has just been placed on the neck of the container, whereas FIG. 5B shows the configuration at the termination of screwing down of the closure device on the container neck. FIGS. 5A and 5B show outwardly convergent frusto-conical end surface 18 of tamper evident band 6.

Figure 6A:
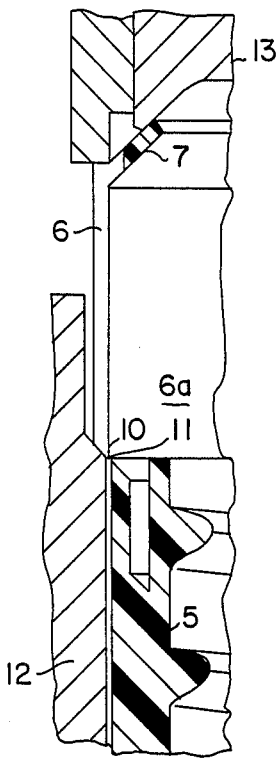
FIGS. 6A, 6B and 6C are sectional views which illustrate different stages during the operation of deforming a retaining bead of the tamper evident band.

FIG. 6A shows the combination of tamper evident band 6 and closure 5 at the end of the molding operation, with the combination of these two elements 5 and 6 placed in a holder ready for the subsequent combination of the two elements.

The section through the tamper evident band 6 passes through one of the slots and shows the extensive depth of the slots between the segments such as 6a–6b. At the end of the molding operation, tips 10 of the segments are connected to closure 5 by frangible bridges 11 which facilitate handling of closure 5 and its associated tamper evident band 6.

Figure 6B:
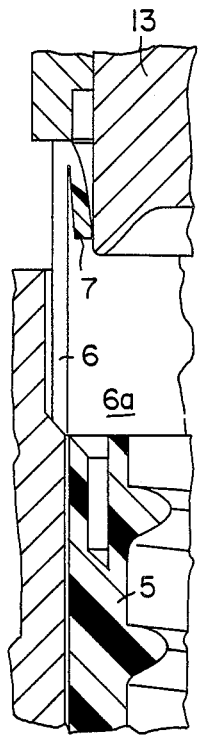
Figure 6C:
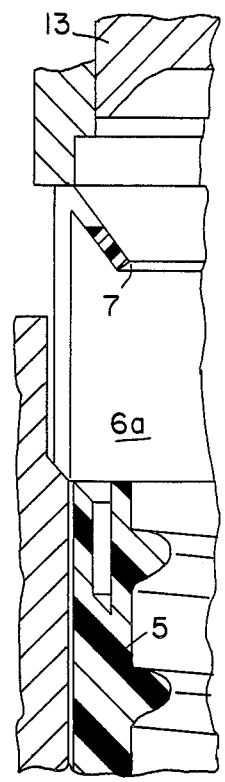

With tamper evident band 6 supported on a tapering ramp surface of an outer support die 12, bead 7 which has been molded in an upwardly tapering configuration is engaged by shaping tool 13 which turns bead 7 so that it points downwardly as shown in FIG. 6C.

FIG. 6B shows shaping tool 13 down in its end position after having inverted bead 7 and while the bead is held in a radially outward deformed configuration by the presence of shaping tool 13.

FIG. 6C shows that after retraction of shaping tool 13, bead 7 has adopted once more a frusto-conical configuration, but now tapering downwardly towards closure 5.

Figure 7:
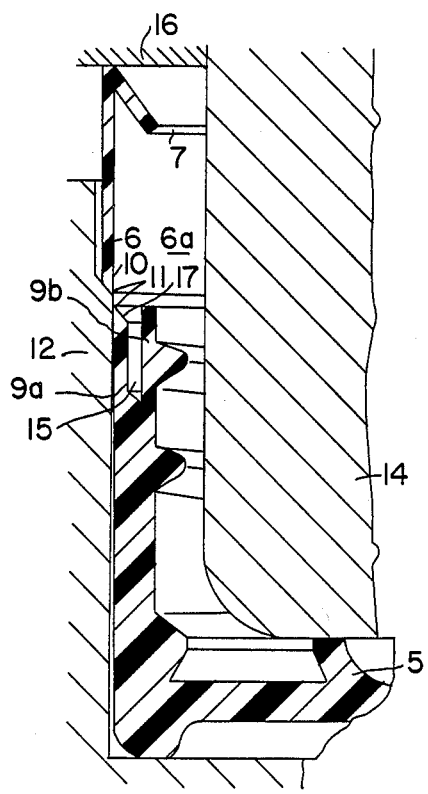
FIG. 7 is a sectional view showing the configuration after separation of an integrally molded closure and tamper evident band.

As shown in FIG. 7, the first step of the assembly operation involves detaching tool 14 which presses closure 5 downwardly while tamper evident band 6 is still supported by outer tool 12, with the result that frangible bridges 11 rupture, to separate closure 5 from tamper evident band 6.

In order then to combine tamper evident band 6 and closure 5 in the desired manner by pushing tamper evident band segments 6a, 6b, etc. into deep annular groove 15 defined between outer and inner skirt portions 9a and 9b referred to above, the upper end of tamper evident band 6 is then engaged by pressing tool 16 which thrusts tamper evident band 6 downwardly to cause tips 10 of its segments to move inwardly and then to move down the ramp surface 17 of outer skirt portion 9a to guide the segments into annular groove 15. For this purpose, segments 6a, 6b, 6c, etc. are separated from one another at their apex ends now that they are no longer connected to outer skirt portion 9a. Previously it was the connection to the outer skirt portion 9a, by virtue of bridges 11, which allowed the segments to be correctly positioned relative to one another at the end of the molding operation.

Figure 8:
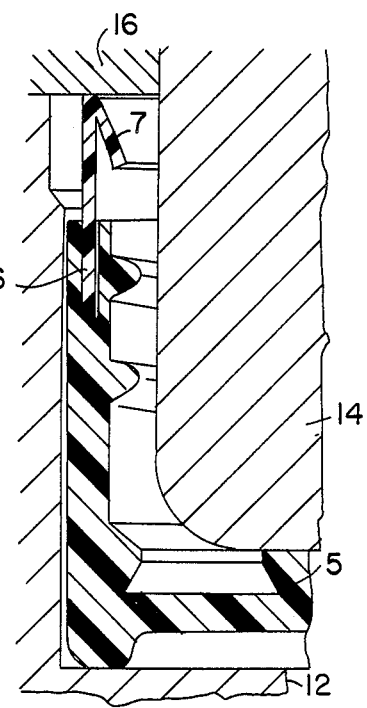
FIG. 8 is a sectional view showing the tamper evident band having been inserted in the closure, with the closure device ready for application to a container.

The termination of this assembly operation is shown in FIG. 8.

The configuration of tamper evident band 6 and closure 5 is such that the segments cannot readily be inserted into groove 15 without the tooling shown in FIGS. 6 to 8.

Figure 9:
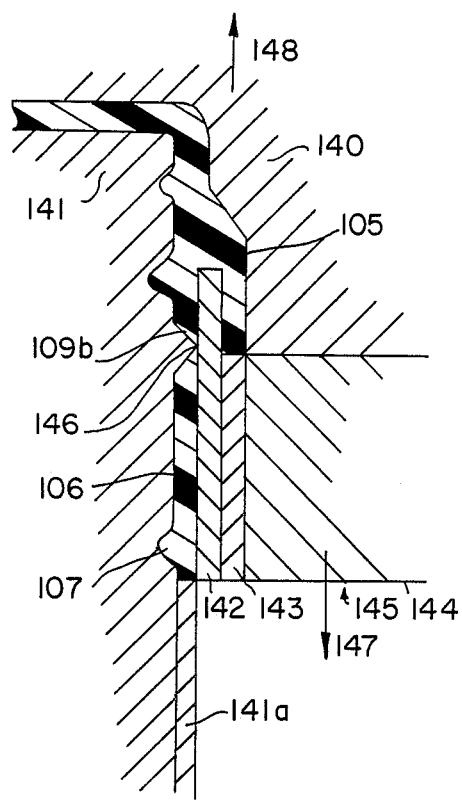
FIG. 9 is a sectional view of another embodiment showing the mold parts for molding the closure and the tamper evident band.
Figure 10:
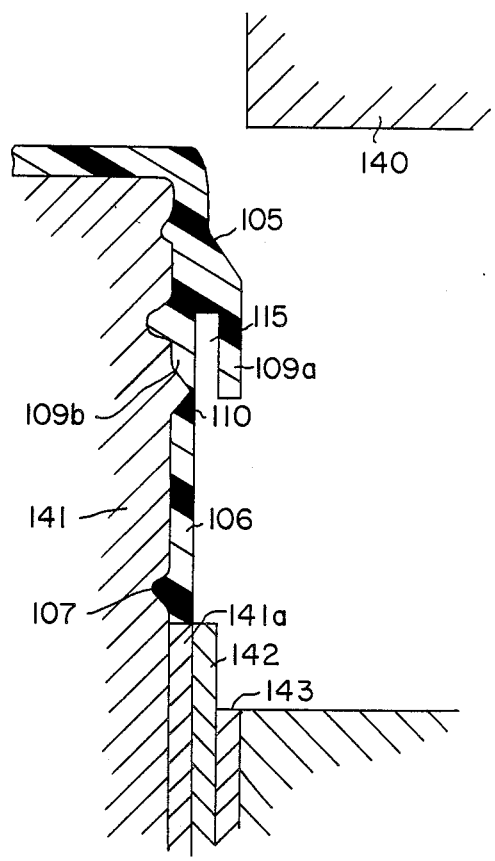
FIG. 10 shows the apparatus of FIG. 9 at the beginning the operation of bumping off the tamper evident band from its mold core.
Figure 11:
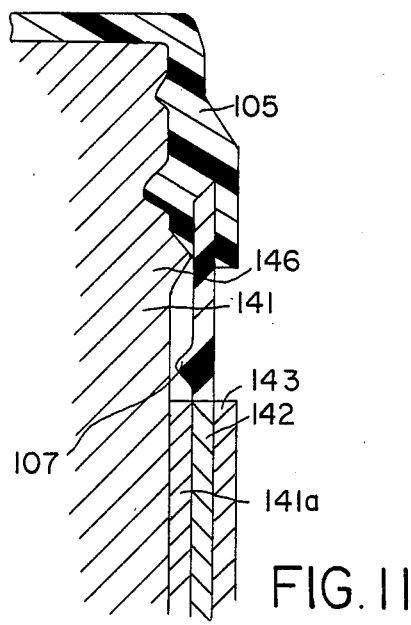
FIG. 11 is a sectional view showing the configuration at completion of the operations of inserting the tamper evident band in the spacing between the two skirt portions of a closure.

An alternative embodiment of the present invention is shown in FIGS. 9 to 11.

FIG. 9 shows the mold configuration for an alternative embodiment of the tamper evident closure device, including the tamper evident band and closure combination. In this case the tamper evident band 106 is molded as a continuation of inner skirt portion 109b of the closure and has inwardly extending bead 107 formed as a "saw tooth" rib. Clearly such inwardly extending rib of the tamper evident band may be of any other suitable design for locking under the transfer ring of the container neck.

The exterior of the closure is formed by a cavity-defining mold part 140 while the interior is defined by a molding core 141 which also defines the interior of the tamper evident band 106.

The exterior of tamper evident band 106 is defined by mold assembly 145 which comprises a radial inner sleeve 142, an intermediate sleeve 143 and an outer sleeve 144 which finally closes the mold. The three constituents 142, 143 and 144 are all able to move vertically independently of one another and are driven to do so in an appropriate sequence. The underside of the tamper evident band 106 is defined by a sleeve 141a surrounding the mold core 141.

An outwardly projecting fin 146 of mold core 141 defines two frusto-conical surfaces of the closure and tamper evident band assembly, namely a first relatively shallow, with respect to the horizontal, surface at the rim of inner skirt portion 109b of closure 105 and a steeper surface at the adjacent outwardly divergent frusto-conical end surfaces of tamper evident band 106. The purpose of this steeper portion at the end of tamper evident band 106 is to facilitate insertion of the tamper evident band segments into recess 115 in a manner to be described later.

FIG. 9 illustrates the closed configuration of the mold at termination of molding of closure 105 and tamper evident band 106 by injection of suitable plastic composition which is the same for the closure as for the tamper evident band. If closure 105 and tamper evident band 106 are not integral they may be formed of different materials in order to exploit different mechanical properties of the plastic material used, and in either case may be of the same or different colors.

During opening of the mold, relative movements of the parts occur as represented by arrows in FIG. 9 where the tamper evident band defining assembly 145 descends relatively in the direction of the arrow 147 and equally the cavity-defining mold portion 140 rises relatively in the direction of the arrow 148. Thus the FIG. 10 configuration is achieved.

As will be appreciated, after cavity defining mold part 140 has lifted, closure 105 is held on mold core 141 by the fact that the internal threads of the closure are still seated in the thread defining recesses of mold core 141. In order to strip closure 105 from mold core 141, it will be necessary to drive closure 105 axially upwardly. In this embodiment of the present invention, the action of driving the closure upwardly, "bumping" or "stripping" it off mold core 141, also achieves the desired result of inserting the various segments of tamper evident band 106 in recess 115.

Radially inner sleeve 142 of assembly 145 is, in the FIG. 10 configuration, arranged with its top surface flush with that of the radially inner sleeve 141a which has just served to define the lower edge of tamper evident band 106.

At the start of the stripping operation, mold core sleeve 141a and radially inner sleeve 142, of the assembly 145, respectively, rise together; while mold core sleeve 141a thrusts tamper evident band 106 upwardly the presence of radially inner sleeve 142 just radially outwardly thereof provides a support onto which the lower edge of tamper evident band 106 can move as its inner bead 107 springs out of the bead-defining recess of mold core 141.

Other stripping movements of the mold parts are possible, for example, it is not necessary for intermediate sleeve 143 initially to withdraw any further than the top of inner sleeve 142.

Simultaneously with this upthrust on tamper evident band 106, its chamfered tip 110, chamfered by the presence of the above mentioned steeply inclined frustoconical surface thereon, rides up over the lower edge of radially inner skirt portion 109b of closure 105 and enters annular groove 115.

Even if the segments of tamper evident band 106 were not completely separated before the start of this stripping operation, they will be severed by the radially outward splaying of the segments.

In order to contain the segments during this splaying operation, the radially inner bottom edge of outer skirt portion 109a extends downwardly beyond the radially outer bottom edge of inner skirt portion 109b, in the configuration viewed in FIG. 10.

At the end of the insertion travel of tamper evident band 106 into annular groove 115, the FIG. 11 configuration will have been achieved.

It then remains for the actual stripping of closure 105 from mold core 141 to be completed, by either further upward movement of tamper evident band 106 now driven by radially inner sleeve 142 while the presence of intermediate sleeve 143 immediately outwardly thereof provides a support surface onto which the tamper evident band lower edge can move in a radially outward direction as bead 107 springs over radially outwardly projecting rib 146 of mold core 141. By the time this movement occurs, closure 106 will have become virtually completely stripped from core 141 and its skirt will therefore itself have sprung outwardly.

It is important to note that whereas the apparatus illustrated in FIGS. 6A, 6B, 6C, 7 and 8 for reversal of bead 7 and insertion of tamper evident band 6 in annular groove 15 of the first embodiment comprise additional elements over and above the mold components, the same operation is achieved in FIGS. 9 to 11 using the mold components themselves. It is therefore the act of opening the mold for the second embodiment which achieves the desired insertion of the segments of tamper evident band 106 into annular groove 115.

The skilled reader will of course appreciate that although the operation of inserting the tamper evident band segments into annular groove 15 or 115 intended to accommodate them, appears to be a relatively straightforward operation when using the tooling illustrated in the drawings, this operation is far from easy in a store where someone may have without authority, opened a container and be anxious to reclose the container in a way which does not reveal that the container has been tampered with. The existence of the various segments which need to be very carefully held in a circular array in order to fit into closure recess 15 or 115 cannot readily be achieved without the assistance of some additional equipment and consequently reassembly of the closure is not easy and hence it is not easy to disguise the fact that it has been tampered with.

Figure 12:
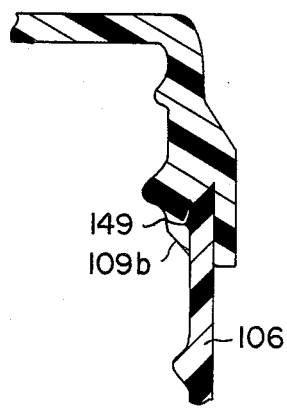
FIG. 12 is a sectional view of another embodiment of a closure and tamper evident band.

FIG. 12 shows a variant of the second embodiment in which radially inner skirt portion 109b of the closure includes a recess which receives inwardly extending projection 149 of tamper evident band 106. The purpose of this is to provide the consumer with a distinct "click" feel as the tamper evident band starts to separate from the closure during unscrewing of the closure from the container.

Projections 149 may either be in the form of individual pips to enter individual dimples of closure skirt portion 109b, or they may comprise discontinuous or continuous beads to engage in suitably arranged grooves in the skirt portion of the closure.

If desired, several sets of projections 149 and corresponding recesses may be provided at various axial stations along the radially inner surface of tamper evident band 106 and the radially outer surface of inner skirt portion 109b, respectively, in order to provide a succession of such click as each of projections 149 snaps into and out of various axially spaced recesses.

If desired, the design of the closure and/or of the tamper evident band may be further modified in order to make it even more difficult for a vandal to be able to reassemble the tamper evident band and the closure after in-store tampering.

It will be appreciated that FIGS. 9 to 12 are intended to illustrate the principle of inserting the tamper evident band in the recess of the closure while stripping the closure from its mold core. Other mold arrangements may, of course, be used in order to implement this principle.

As mentioned above with the embodiment of FIGS. 1 to 8, the tamper evident band may be molded entirely separately from the closure, or may be molded integrally therewith but joined by breakable bridges as illustrated in the two embodiments described above. The molding of the two components of FIGS. 1 to 8 in an integral relationship simplifies subsequent handling of the components before insertion of the tamper evident band into the groove of the closure and is therefore preferred.

The closure device in accordance with the invention is suitable for any type of container made from glass, plastic of metal, such as jars and bottles for food and beverages.

We claim:

1. A plastic tamper evident container closure assembly comprising a container closure having a shirt, a tamper evident band having inwardly projecting means capable of holding said tamper evident band on said container while said closure is removed therefrom, said closure skirt being formed with an annular groove between radially spaced skirt portions of said closure, and said tamper evident band being dimensioned to be received tightly within said annular groove and comprising a plurality of segments which are separated from one another by slits extending at least partially through said tamper evident band in an axial direction thereof.

2. A closure assembly according to claim 1, wherein said projecting means comprises a radially inwardly projecting bead of said tamper evident band.

3. A closure assembly according to claim 1, wherein said tamper evident band has a frusto-conical surface at the end which is received in said annular groove of said closure, said frusto-conical surface being convergent in a direction towards said closure in the assembled configuration of said tamper evident band and closure.

4. A closure assembly according to claim 1, wherein said closure is internally threaded.

5. A plastic tamper evident container closure assembly comprising a container closure having a skirt, and a tamper evident band having inwardly projecting means capable of holding said tamper evident band on said container while said closure is removed therefrom, said closure skirt being formed with an annular groove between radially spaced skirt portions of said closure, and said tamper evident band being dimensioned to be received tightly within said angular groove, said tamper evident band has an end surface of frusto-conical form at the end which is received in said annular groove of said closure, said frusto-conical surface being outwardly divergent in a direction towards said closure in the assembled configuration of said tamper evident band and said closure.

6. A closure assembly according to claim 5, wherein said projecting means comprises a radially inwardly projecting bead of said tamper evident band.

7. A closure assembly according to claim 5, wherein said closure is internally threaded.

8. A plastic tamper evident container closure assembly comprising a container closure having a skirt, and a tamper evident band having inwardly projecting means capable of holding said tamper evident band on said container while said closure is removed therefrom, said closure skirt being formed with an annular groove between radially spaced skirt portions of said closure, and said tamper evident band being dimensioned to be received tightly within said annular groove, said tamper evident band has a projection and said annular groove in said skirt has a recess receiving said projection providing a definite feel when said closure is removed from said container on which said tamper evident band is retained in place.

9. A method for forming a plastic tamper evident closure device, comprising molding a closure and a separate tamper evident band therefor, said closure being formed with an annular groove between radially inner and outer skirt portions of an internally threaded skirt of said closure; and inserting one end of said tamper evident band in said annular groove of the closure, said tamper evident band and said closure are molded on a common mold core, and wherein the insertion of said tamper evident band into said annular groove is effected during stripping of said tamper evident band and said closure from said common molding core.

10. A method according to claim 9 wherein an inwardly extending bead on the upper edge of said tamper evident band is molded in an upwardly extending configuration and turned to a downwardly tapering condition by movement of a shaping tool.

11. Apparatus for molding a plastic tamper evident closure comprising a common mold core for defining the interior of an internally threaded closure and a tamper evident band therefor; means defining an annular groove between radially inner and radially outer portions of a skirt of said closure; means defining a tapered surface to said tamper evident band defined by said molding apparatus; and means for driving said tamper evident band into said annular groove after withdrawal of said groove defining means of said molding apparatus and for thereby ejecting said tamper evident band and said closure from said common mold core.

12. Apparatus according to claim 11 further comprising a shaping tool insertable within said tamper evident band engaging an upwardly extending bead on the upper edge of said tamper evident band turning said bead to a downward tapering condition by downward movement of said shaping tool.

* * * * *